ONE-OUT-OF-MANY CODE STORAGE SYSTEM

Filed Feb. 27, 1961 3 Sheets-Sheet 1

| DIGIT A | DIGIT B | CORES a1 | CORES a2 | CORES b1 | CORES b2 | READ WIRE OUTPUT 10a | READ WIRE OUTPUT 10b |
|---|---|---|---|---|---|---|---|
| 0 | 0 | 1 | 0 | 0 | 0 | -ve | ZERO |
| 0 | 1 | 0 | 0 | 0 | 1 | ZERO | +ve |
| 1 | 0 | 0 | 0 | 1 | 0 | ZERO | -ve |
| 1 | 1 | 0 | 1 | 0 | 0 | +ve | ZERO |
Fig. 3.
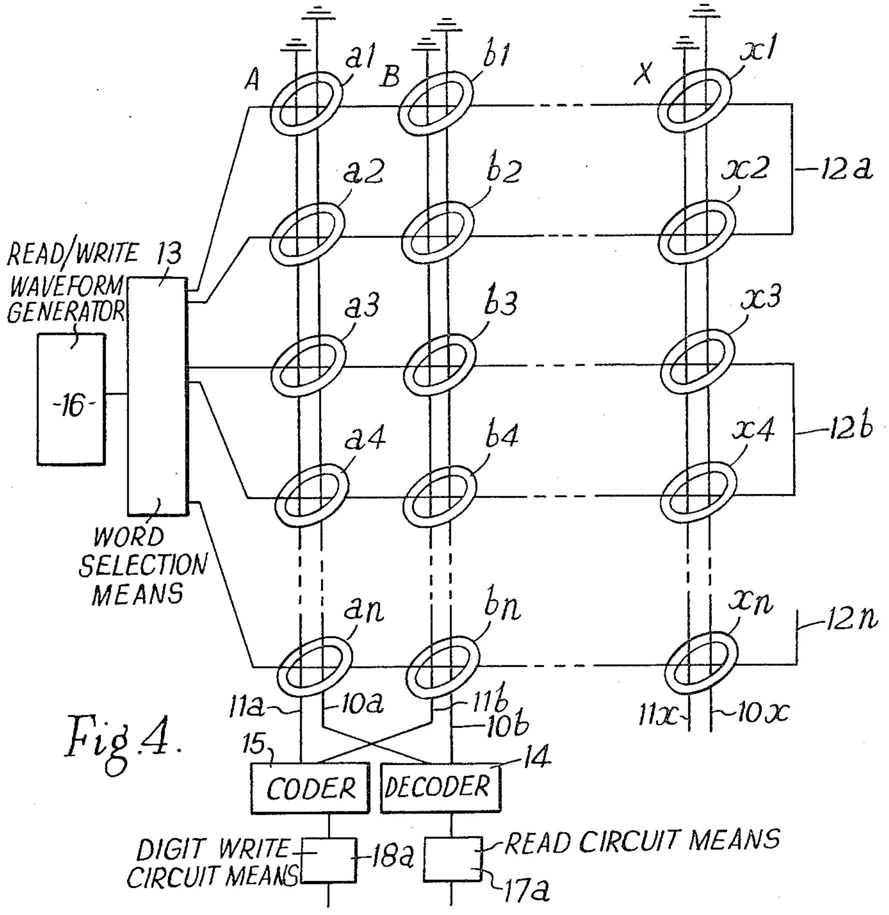
Fig. 4.
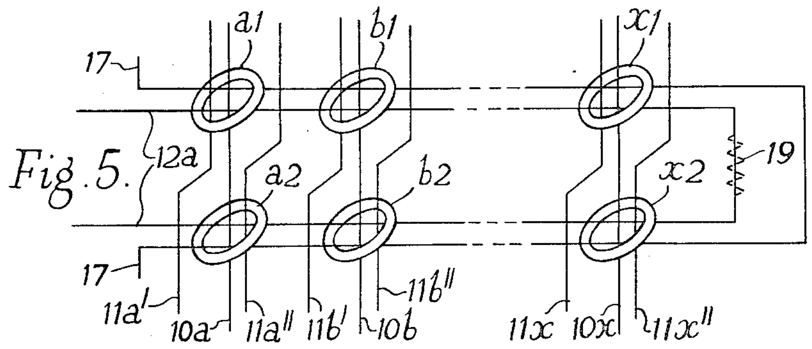
Fig. 5.

3,218,614

ONE-OUT-OF-MANY CODE STORAGE SYSTEM

Tom Kilburn, Urmston, and David Beverley George Edwards and Michael John Lanigan, Manchester, England, assignors, by mesne assignments, to International Business Machines Corporation, New York, N.Y., a corporation of New York Filed Feb. 27, 1961, Ser. No. 91,963
Claims priority, application Great Britain, Aug. 30, 1960, 29,929/60
3 Claims. (Cl. 340—174)

This invention relates to magnetic core storage systems and more particularly to a magnetic core storage system including a multiplicity of cores for storing each bit value in one-out-of-many code.

Magnetic core storage devices in the prior art are of two basic types which may be referred to as one-core-per-bit and two-core-per-bit types. In the one-core-per-bit type, each storage core has assigned to it the function of storing a binary digit (bit) of information. The binary digit is a 1 or a 0, according to whether the core is at a first or a second magnetic state. In the two-core-per-bit storage device, one core is generally used to store the bit value and the other core used to provide a noise balancing function.

The memory array, according to the invention, registers the value of each binary digit as a pattern of states of a group of cores arranged to represent the different possible value combinations of a group of binary digits. The pattern of states of four storage cores may represent possible value combinations of two binary digits. The pattern of states of eight cores may represent the possible value combinations of three binary digits. In the general case, according to the invention, $2^n$ cores may be used to represent $n$ digits.

*Objects*

An object of the invention is to provide a magnetic storage device suitable for large capacity parallel mode random access storage at a reduced cycle time.

Another object of the invention is to reduce the extent of spurious or interference signal during the reading operation of a magnetic core storage device.

Yet another object is to reduce the variety of loading demand upon the current sources which provide the reading and writing pulses.

Another object of the invention is to stabilize the number of cores changing state at any storage access, independent of the digit values.

*Features*

A feature of the invention is a storage arrangement in which the relative states of a number of cores represent possible value combinations of a plurality of binary digits. For example, $2^n$ cores may be used to represent $n$ digits.

Another feature of the invention is an arrangement for applying increased value read current pulses simultaneously with a suitable magnetic bias to all non-selected cores so that a single digit winding may thread both cores of a core pair.

*Advantages*

An advantage of the invention is a fixed requirement on the current drivers in that a fixed number of cores change state at each memory reference.

*Summary—See FIGURES 3 and 4*

The invention is a magnetic core storage system in which a small plurality of binary digits are stored in one-out-of-many fashion in a larger number of binary magnetic elements. Generally, $n$ binary digits are stored as a 1 value in a particular single element of a $2^n$ element group, $n$ being an integer greater than unity.

The coding pattern for the case where $n=2$, which pattern always has a single 1 value, is shown in FIGURE 3.

The $2^n$ binary elements for storing the 1-out-of-$2^n$ code pattern derived from the $n$ binary digits are traversed by a word wire in pairs in a fashion such that only one element in the pair can be set to the 1 value. A coder and decoder are arranged in the read-write digit circuits to control storage accessing in the 1-out-of-$2^n$ code for each of the $n$ digits.

The storage device provides for change of state of one core only, of the 1-out-of-$2^n$ cores of a group, on any one storage access, thus providing a constant load for the access drive circuits.

The foregoing and other objects, features and advantages of the invention will be apparent from the following more particular description of a preferred embodiment of the invention, as illustrated in the accompanying drawings.

In the drawings:

FIGURE 3 is a table showing a coding system according to the invention;

FIGURE 4 is a schematic wiring diagram, similar to FIGURE 1, of a fragmentary part of a matrix type store modified to operate with the coding system set forth in the table of FIGURE 3;

FIGURE 5 is a schematic wiring diagram, similar to FIGURES 1 and 4, showing a modified arrangement;

Figure 2:
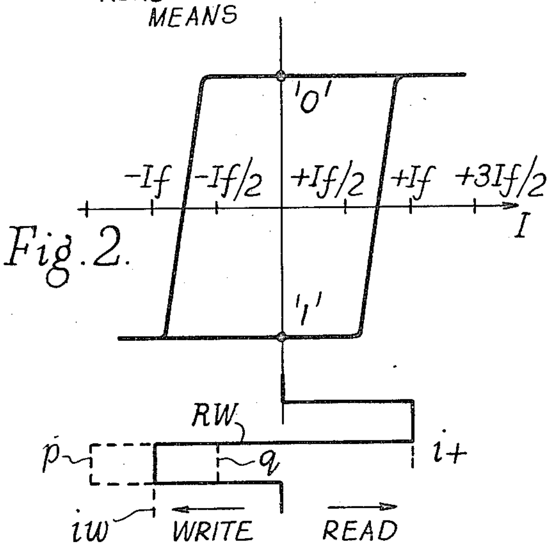
FIGURE 2 is a graphical diagram illustrating an idealised form of the hysteresis loop of the magnetic material used for forming the various individual storage cores of a store embodying the invention and one form of the applied read/write current.
Figures 6, 7, 8, 9, 10:
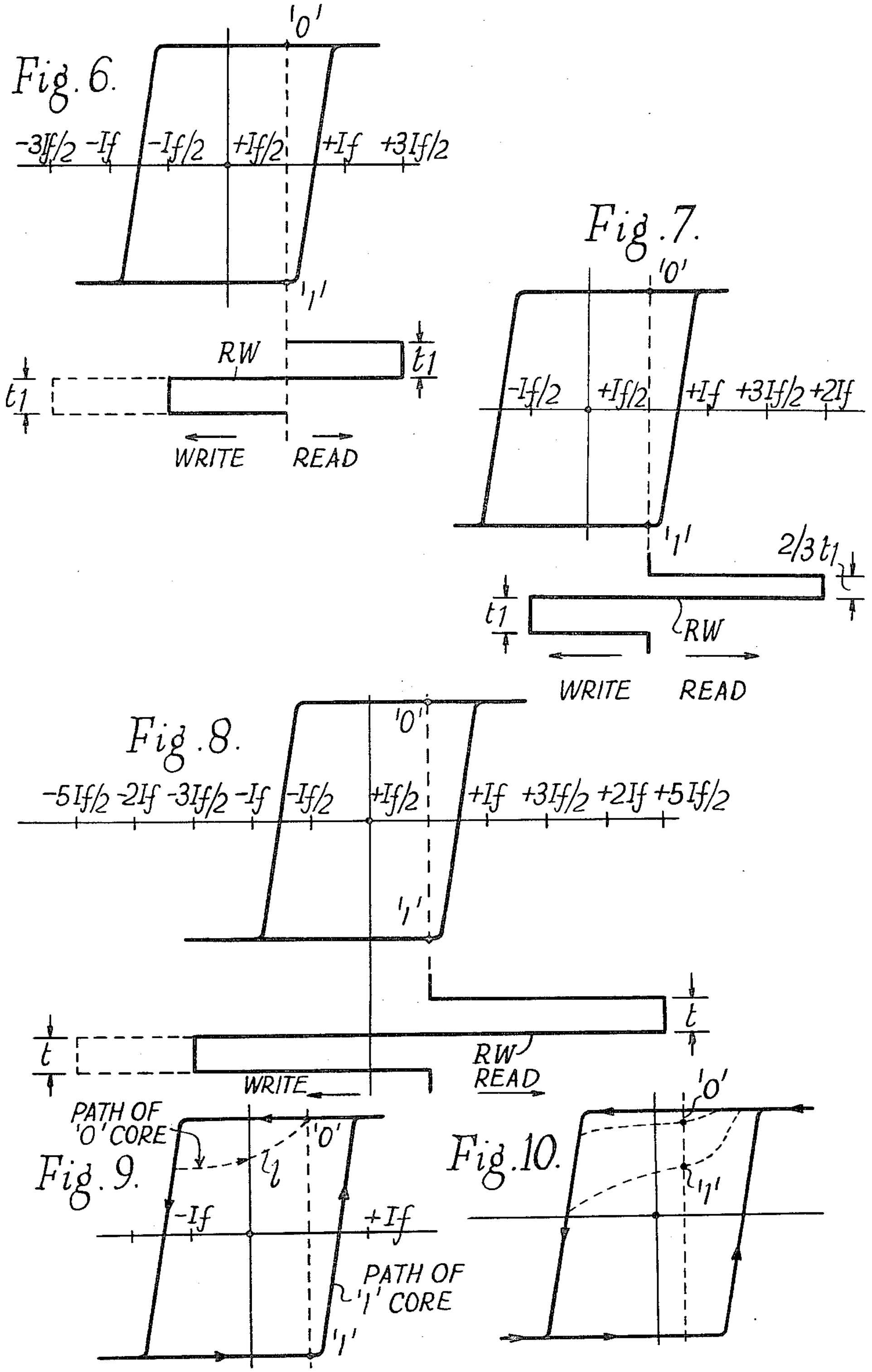

FIGURES 6, 7 and 8 are graphical diagrams similar to FIGURE 2, illustrating alternative forms of the applied read/write currents and the manner of operation therewith in conjunction with applied magnetic bias to the storage cores; while FIGURES 9 and 10 are further graphical diagrams of idealised forms of the hysteresis loop of the core material illustrating the manner of operation under different conditions.

Figure 1:
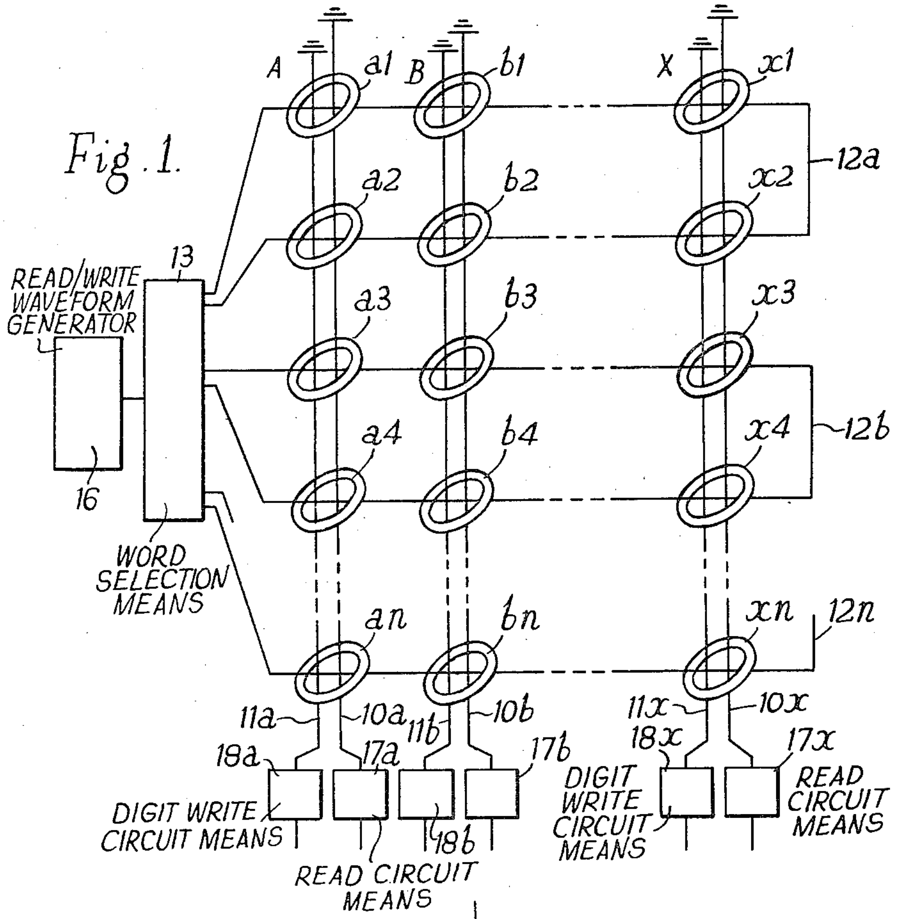
FIGURE 1 is a schematic wiring diagram used to illustrate the word accessing function required by the invention.

Referring first to FIG. 1 of the drawings, which shows the wiring arrangement of one embodiment of the invention, the magnetic store cores *a*1, *a*2, *a*3, *a*4 . . . *an* of column A are threaded by a common read wire 10*a* and by a common digit wire 11*a*. Similarly, the cores *b*1, *b*2, *b*3, *b*4 . . . *bn* of column B are threaded by a common read wire 10*b* and by a common digit wire 11*b*. The remaining cores of the matrix are arranged in similar manner, the cores *x*1, *x*2, *x*3, *x*4 . . . *xn* of the final column X being threaded by common read wire 10*x* and by common digit wire 11*x*. In addition, the core pairs *a*1 and *a*2 of column A, *b*1 and *b*2 of column B and so on to the pair *x*1 and *x*2 of the column X are all threaded by a single word wire 12*a* which passes first through cores *a*1, *b*1 . . . *x*1 and is then looped back through cores *x*2 . . . *b*2, *a*2. The remaining cores of the matrix are dealth with similarly in pairs as indicated by further word wires 12*b* . . . 12*n*.

The various word wires 12*a*, 12*b* . . . 12*n* are shown connected to word selection means 13 by means of which a source or generator 16 of a read/write current waveform, to be described later, can be connected to any chosen one of the aforesaid word wires. Both the selection means 13 and the source or generator 16 can be of any suitable form already well known and established in the art. For example, the selection means 13 may comprise a suitable electric or electronic switching system employing mechanical switches or thermionic valves or transistors but conveniently comprises a matrix of diodes, either alone or in combination with linear current transformers or transformers wound upon cores of so-called square loop material. The source or generator 16 may comprise thermionic valves or transistors, suitably time controlled by pulse waveforms and may include pulse transformers and suitable squaring circuits for obtaining a square pulse type of waveform.

The various read wires 10*a*, 10*b* . . . 10*x* are each shown as grounded at one end and connected at the opposite end to associated read circuit means 17*a* 17*b* . . . 17*x* while the corresponding digit wires 11*a*, 11*b* . . . 11*x* are shown as grounded at one end and each connected at the opposite end to associated digit write circuit means 18*a*, 18*b* . . . 18*x*. The read circuit means 17*a*, 17*b* . . . 17*x* operate to interpret the signals which are present upon the associated read wire and to convert these into a form suitable for use as digit signals in the associated computing or other machine. Such read circuit means may be of any suitable form already well known and established in the art, for example, trigger circuit devices employing thermionic valves or transistors by which a transient pulse output on the associated read wire may be converted into a sustained current or voltage or into a pulse of predetermined shape and amplitude. The digit write circuit means 18*a*, 18*b* . . . 18*x* operate to supply to the associated digit wire a current of predetermined amplitude and polarity as discussed in detail later, at times coincident with the write phase of the read/write current waveform under the control of an input signal denoting the particular digit value "0" or "1" which is to be written into the store. Such write circuit means again are well known in the art and those used may be of any suitable known and established form.

FIG. 2 illustrates an idealised hysteresis loop of the material of the various cores *a*1, *a*2 . . . *bn*, *xn*. In the same figure, the waveform RW indicates the read/write current which is applied to a chosen word wire 12*a*, 12*b* . . . 12*x* through the word selection means 13.

In the illustrated embodiment, each digit is registered by the relative magnetisation states of a pair of cores in a given column. Thus cores *a*1, *a*2 deal with digit A and cores *b*1, *b*2 with digit B of a given word and so on, cores *x*1, *x*2 dealing with the last digit of such word.

Let it be assumed that, initially,

Core *a*1 is magnetised in the "1" state }
Core *a*2 is magnetised in the "0" state } digit A Core *b*1 is magnetised in the "0" state }
Core *b*2 is magnetised in the "1" state } digit B The stored value of the digit is defined by the magnetisation state of the first core of each pair, thus in the example quoted, digit A is of value "1" and digit B is of value "0."

Upon application of the initial positive-going read phase of the current waveform RW (FIG. 2) with an amplitude $i_r$ such that the magnetisation produced thereby$=+I_f$ to, say the word wire 12*a*, for the "read" time period, all of the cores *a*1, *b*1 . . . *x*1, *x*2 . . . *b*2, *a*2 threaded by the word wire 12*a* are constrained to return to the "0" state and, in consequence, cores *a*1 and *b*2 change their state. The word wire defines the "0" state of the cores it traverses, as the state resulting from a word read pulse. Since the read wire for each digit position links each core of a core pair, e.g. the read wire 10*a* links cores *a*1 and *a*2, in an opposite sence with respect to the word wire, the polarity of the read pulse on any read wire 10*a*, 10*b* . . . 10*x* depends upon which core of a core pair is reversed in state. Thus, in the example given, if digit $A=1$ is indicated by a negative pulse on read wire 10*a*, then digit $B=0$ will be indicated by a positive pulse on read wire 10*b*. Since the reading process destroys the stored information, rewriting is necessary if the previously stored information is to be retained.

In the following write period or phase of the read/write waveform RW, FIG. 2, the word wire current is reversed to value $i_w=-I_f$ and simultaneously a write current of value $+I_f/2$ or $-I_f/2$ is applied by the associated write circuit means 18*a*, 18*b* . . . 18*x* to each of the digit wires 11*a*, 11*b* . . . 11*x* in accordance with the required digit values to be stored. Such write currents assist the writing action of the word wire current RW in one core of a core pair and inhibit its action in the other. Thus, if the previous digit values $A=1$ and $B=0$ are to be restored, a digit write current of value $-I_f/2$ is applied to digit wire 11*a* while a digit write current of value $+I_f/2$ is applied to digit wire 11*b*. The aiding or inhibiting effect of such write currents are illustrated respectively by the dotted lines *p* and *q* in FIG. 2.

Since one core of each pair always changes state during the reading and writing operations, with such an arrangement, the number of cores changing state in any word storage group of cores is always the same and is independent of the digit value pattern and as a result of this the load upon the driving circuits remains constant. In addition the read signals of opposite polarity for the alternative digit values provide enhanced discrimination while partial flux switching systems, i.e. those in which the output signal is determined from the difference in flux content of the two cores forming a digit group, may be employed.

The load presented by the selected word wire 12*a*, 12*b* . . . 12*n* to the word driver or source 16 of word wire current may be reduced, in accordance with the invention, by the adoption of a coding system in which the different state of one only of a group of cores relative to the state of the remaining cores of the group is used to represent each of the various possible digit value combinations of a group of binary digits.

For example, the cores may be taken in groups of four to deal with the possible value combinations of two binary digits or in groups of eight to deal with three binary digits and so on. The table of FIG. 3 shows one possible coding system for a four core/two digit grouping in an arrangement as shown schematically in FIG. 4, and in which the position, within each four core group, of the single core in the "1" state is indicative of the digit combination being stored. The remaining three cores of each group are all in the "0" state and consequently do not reverse their states in either the read or the write period. The power required from the waveform source 16 is accordingly halved as is that required for writing from the write circuit means 18*a*, 18*b* . . . 18*x*, since the number of digit drivers which need to be operated is similarly reduced.

The arrangement of FIG. 4 is basically similar to that of FIG. 1 and the parts have been given like references. The signalled information upon the read wires 10*a*, 10*b* . . . 10*x* is now in the form of either a positive and a zero signal or a negative and a zero signal on each pair of read wires and it becomes necessary to include decoder means as indicated at 14 in FIG. 4 to provide output signals of a form acceptable to the rest of the machine. Similarly a coder means, as indicated at 15 in FIG. 4, must be provided for each pair of digit write input wires 11*a*, 11*b* . . . 11*x* to the store. Such coder and decoder means may conveniently comprise diode gate circuits.

In this modified coded system, it is necessary to provide for the switching during writing of either one of the cores of a pair, as before, and also for the condition where neither core of the pair is switched. This may be achieved by limiting the amplitude of the write phase current $i_w$, FIG. 2, to a value of the order of $-I_f/2$ or any value in excess of this up to the critical value corresponding to the knee of the hysteresis curve. Some slight increase of the digit write circuit may be necessary to ensure reliable switching. When one core of a pair is to be switched, the digit write current is given a polarity such as will switch the required one of the two cores. When neither core of a pair is to be switched, the associated write current means are arranged not to supply any digit write current to the related digit wire.

As an alternative to such reduction of amplitude of the write phase current $i_w$, use may be made of the modified arrangement illustrated in FIG. 5 and described later. In such modification while a common read wire 10$a$, 10$b$ . . . 10$x$ passes through each core of one pair, separate digit write wires, such as 11$a'$ and 11$a''$, are used for the two cores, such as $a$1 and $a$2. This enables an appropriate polarity of digit write current to be applied to each core of the pair so as either to switch core $a$1 and inhibit core $a$2 or to switch core $a$2 and inhibit core $a$1 or to inhibit both cores $a$1 and $a$2. The code means 15 will, of course, be arranged to supply the appropriate currents of different polarity to the respective digit wires in accordance with the signalled value of the digits to be written into the store.

The minimum cycle time of the systems as so far described is limited by the switching time of the respective cores in the read and write periods and such switching time may be reduced by increasing the amplitude of the read current and hence of the magnetising force applied to the cores during the read phase period. Corresponding increase of the amplitude of the write current, desirable both to decrease the switching time and to retain a balanced waveform, is limited by the fact that the effect of such write currrent must be capable of being inhibited by the applied digit current where required and the requirement that the value of the latter must not exceed $I_f/2$ since the digit wire to which it is applied also passes through cores associated with other unselected word storage locations whose existing stored values must not be disturbed.

FIG. 5 illustrates a modification of the system previously described in which increased reading and writing currents may be used and, in consequence, increased switching speeds may be obtained. It will be understood that FIG. 5 shows only a modified fragment of the previous FIGS. 1 or 4 which, in turn, each illustrate only a small part of a practical word store.

In FIG. 5 the cores $a$1, $a$2, $b$1, $b$2 . . . $x$1, $x$2 are threaded as before by read wires 10$a$, 10$b$ . . . 10$x$, and by a word wire loop 12$a$. The digit wires, however, are now divided, those of 11$a'$, 11$b'$ . . . 11$x'$ threading only the first core of each pair of associated cores on each column, and those of 11$a''$, 11$b''$ . . . 11$x''$ threading only the second core of each pair of associated cores in each column. In addition, a bias wire 17 threads all cores of the matrix.

The operation of this modified system will be explained with reference also to FIG. 6 which shows again an idealised hysteresis loop of the material of the cores in relation to the read/write waveform RW. The bias wire 17 is supplied with a direct current bias $+I_f/2$ to displace the effective zero level datum of the read/write waveform RW as shown; the amplitude of the read current phase is now $+I_f$ whereby the nett drive in the read period is equal to $+3I_f/2$. The amplitude of the write current phase is now $-I_f$ and the digit current, one of amplitude $-I_f$, is applied only when writing of value "1" is required. Thus the effective drive during writing is only $-I_f/2$ or digit value "0" and becomes $-3I_f/2$ for digit "1." A balanced word current waveform is retained and as the digit currents always act in opposition to the bias current, they cause only relatively small disturbances in the cores of unselected words. The minimum cycle time is now $2t_1$, where $t_1$ is the switching time of the cores for a drive current of $3I_f/2$.

The added constructional complexity of having separate digit wires which respectively thread only one core of each core pair can be overcome in most practical instances by arranging the cores $a$1, $b$1 . . . $x$1 and so on in one core plane and the other cores $a$2, $b$2 . . . $x$2 and so on in another core plane arranged back to back with the first. With such an arrangement, one half of each rear wire 10$a$, 10$b$ . . . 10$x$ lies in each plane, each half threading N cores where N is the number of word storage locations provided in the store. Each read wire may then be earthed at its centre point, i.e. where it passes from one core plane to the other and a push-pull output obtained for application to a difference amplifier in the associated read circuits of the store. In this way, the transmission delay of the read signal may be halved.

Still further reduction of the cycle time may be obtained, in accordance with the last described embodiment, by further increasing the magnitude of the read current and, if a balanced waveform is to be retained, proportionately decreasing the duraion of the read period relatively to the write period. One possibility along these lines is illustrated in FIG. 7 where the word wire waveform RW has the amplitude of the read current phase increased to $+3I_f/2$ with a reduced time duration of $2/3t_1$. The applied bias is $+I_f/2$ as before. The amplitude of the write current phase is $-I_f$ and of time duration $t_1$ as before. Although the waveform is still balanced, the cycle time is reduced to $5/3t_1$.

In arrangements as just described it may be found necessary to include loading resistance as indicated in dotted lines at 19 in FIG. 5 in order to reduce the time constant associated with the loop inductance to a suitable value. When operated at very high repetition frequencies, e.g. 625 kc./s. (equivalent to a cycle time of 1.6 microseconds), steps, such as immersion in an oil bath, are desirable to improve the efficiency of heat dissipation; temperature control may be necessary.

A further increase in the maximum operating speed of a biased system as already described with reference to FIG. 5 may be obtained by allowing partial switching of those cores in which a digit value signifying change of state is not required during the write period. FIG. 8 shows an idealised form of hysteresis loop with relation to the read/write waveform of this mode of operation, while FIG. 9 is a hysteresis loop diagram showing the loop paths for the respective cores of a core pair when operated in this further modified manner.

The bias current is, as before, made equal to $+I_f/2$ and the read current made of magnitude $+2I_f$ so that the net drive on the cores during the read period is $+5I_f/2$. This is sufficient to set all cores into the "0" state in about 0.2 microsecond. In the following write period, the word wire current is $-2I_f$ and the applied digit current to those cores which require setting to the "1" state made equal to $-I_f$. The effective drive to the "1" state cores accordingly becomes $-5I_f/2$ whereas that to the "0" state cores is $-3I_f/2$. The duration time $t$ however is made sufficiently small to prevent any significant change in the cores subjected only to such $-3I_f/2$ drive with the result that, as shown in FIG. 9, the "0" state core returns to its previous "0" state after cycling around the minor loop $l$.

In order to reduce the power requirements of the word wire drive means while retaining the same cycle times, the amount of flux change which occurs in the memory cores may deliberately be limited to a value less than that necessary to effect full switching from one state to the other. In such a modified scheme, which is applicable to any of the different systems already described, one state of saturation of the cores, e.g. the "0" state, is used as a reference and both cores of each selected pair are set into this state in the read phase of the store cycle. During the subsequent write phase, flux changes occur in both cores of each pair but it is arranged, by the aforementioned limitation of flux change values, that one core of each pair changes much more than the other but that, at the same time, the larger flux change is only of the order of, say, 25% of a complete switch from one saturation limit to the other.

FIG. 10 is a hysteresis loop diagram showing the loop paths for the respective cores of a core pair operated under such partial-flux switching system. The restriction of the amount of flux change may be effected by limiting the available flux change in the switch core used to drive the word wire or by other means imposing limitation upon the amplitude and/or duration, either actual or effective, of the write current.

The various systems and arrangements described above are particularly applicable to use with driving apparatus employing transistors.

We claim:

1. A digital storage device comprising:

(a) a plurality of binary magnetic elements arranged as a matrix, in which for the storage of each *n*-digit word a total of $2^n$ cores arranged as pairs of first and second cores is employed;

(b) a multiplicity of word wires, each threading each of said first cores and returning through each of said second cores of a related N-digit word;

(c) a multiplicity of read-write wire means, each such wire means threading both the first and second cores of a different one of said core pairs;

(d) a source of read-write current connected to said word wires, said source providing a read current pulse of one polarity and a subsequent write current pulse of opposite polarity to a selected one of said word wires;

(e) read circuit means connected to each of said read wire means to detect the presence and polarity of signals generated in said read wire means during the time of said read current pulse;

(f) write circuit means, connected to each of said digit write wire means, to apply currents of polarities determined by the respective digit values to be stored to said digit write wire means during the time of said write current pulse;

(g) decoder circuit means, connected to said read circuit means, common to a selected group of said read and write wire means; and (h) coder means, connected to said write circuit means, common to said selected group of said read and write wire means.

2. A digital storage device according to claim 1, wherein said read-write wire means includes sepaarte read wire and a write wire.

3. A digital storage device comprising:

(a) a plurality of binary magnetic elements arranged as a matrix, in which for the storage of each n-digit word a total of $2^n$ cores arranged as pairs of first and second cores is employed, *n* having a value greater than 2;

(b) a multiplicity of word wires, each threading each of said first cores and returning through each of said second cores of a related N-digit word;

(c) a multiplicity of read-write wire means, each such wire means threading both the first and second cores of a different one of said core pairs;

(d) a source of read-write current connected to said word wires, said source providing a read current pulse of one polarity and a subsequent write current pulse of opposite polarity to a selected one of said word wires, said read current pulse and said write current pulse each having an amplitude in excess of that required to drive any core from zero magnetization to saturation level of magnetization;

(e) read circuit means connected to each of said read wire means to detect the presence and polarity of signals generated in said read wire means during the time of said read current pulse;

(f) write circuit means, connected to each of said digit write wire means, to apply currents of polarities determined by the respective digit values to be stored to said digit write wire means during the time of said write current pulse;

(g) decoder circuit means, connected to said read circuit means, common to a selected group of said read and write wire means;

(h) coder means, connected to said write circuit means, common to said selected group of said read and write wire means.

(i) a bias wire threading all of the cores of said device; and (j) a source of bias current connected to said bias winding, said bias current being of a value sufficient to prevent magnetization of any core to saturation by said write current pulse.

References Cited by the Examiner

UNITED STATES PATENTS

| | | | |
|---|---|---|---|
| 2,666,151 | 1/1954 | Rajchman et al. | 307—88 |
| 2,802,203 | 8/1957 | Stuart-Williams | 340—174 |
| 2,882,517 | 4/1959 | Warren. | |
| 2,933,720 | 4/1960 | Newhouse et al. | |
| 3,023,402 | 2/1962 | Bitman | 340—174 |
| 3,090,036 | 5/1963 | Kauffman. | |
| 3,110,888 | 11/1963 | Kluck | 340—174 |
| 3,121,862 | 2/1964 | Ridenour | 340—174 |
| 3,141,154 | 7/1964 | Hall | 340—174 |

IRVING L. SRAGOW, *Primary Examiner.*

JOHN F. BURNS, *Examiner.*